United States Patent [19]
Kamalski

[11] Patent Number: 5,848,354
[45] Date of Patent: Dec. 8, 1998

[54] SYSTEM FOR TRANSMITTING DATA IN PACKETS

[75] Inventor: Theodor I. E. Kamalski, Eindhoven, Netherlands

[73] Assignee: u U.S. Philips Corporation, New York, N.Y.

[21] Appl. No.: 626,092

[22] Filed: Apr. 3, 1996

[30] Foreign Application Priority Data

May 8, 1995 [EP] European Pat. Off. ........... 95201172.4

[51] Int. Cl.⁶ .................................................. H04Q 7/06
[52] U.S. Cl. ...................................... 455/38.1; 455/186.1
[58] Field of Search ..................................... 370/310, 312, 370/313, 314, 349; 340/825.44; 455/186.1, 38.1

[56] References Cited

U.S. PATENT DOCUMENTS

| | | | |
|---|---|---|---|
| 4,742,516 | 5/1988 | Yamaguchi | 370/312 |
| 5,181,208 | 1/1993 | Duckeck | 455/228 |
| 5,239,681 | 8/1993 | Parnall et al. | 455/38.1 |

FOREIGN PATENT DOCUMENTS

0188364B1  3/1992  European Pat. Off. .......... H04H 1/00

OTHER PUBLICATIONS

Pierre R. Schwob, "An In–Receiver Database—The Critical Factor In RBDS", IEEE Transactions on Consumer Electronics, vol. 39, Iss. 3, pp. 442–447, Aug. 1993.

*Primary Examiner*—Melvin Marcelo
*Attorney, Agent, or Firm*—Edward W. Goodman

[57] ABSTRACT

In a system for transmitting data, having a transmitting station and at least one receiving station, data is transmitted in packets of a first type, including a first data type identifier and data, and a second data type identifier, indicative of the type or nature of the data, is transmitted in a packet of a second type, including a further first data type identifier and the second data type identifier, wherein the first data type identifier and further first data type identifier are provided for linking the second data type identifier to the data. As the length of the first data type identifier is shorter than the length of the second data type identifier, the efficiency of the packets of the first type is improved in comparison with a system which only transmits packets of a first type, including the second data type identifier and the data. The invention is especially useful in RDS, wherein the packet of the first type is a version A group and a packet of the second type is a version B group.

10 Claims, 6 Drawing Sheets

SYSTEM FOR TRANSMITTING DATA IN PACKETS

BACKGROUND OF THE INVENTION

1. Field of the Invention

The invention relates to a system for transmitting data comprising a transmitting station and at least one receiving station, said data being arranged in packets of a first type, comprising a first data type identifier.

The invention further relates to a transmitting station and a receiving station for use in such a system, a method for transmitting data and a method for receiving data.

2. Description of the Related Art

Such a system, transmitting station, receiving station and methods are known from the European Patent Specification EP 0 188 364 B1, corresponding to U.S. Pat. No. 4,742,516. This describes a.o. a system in which data is transmitted in packets, each packet comprising a first data type identifier which in this case, indicates the nature or substance of the data. When a large number of different types of data needs to be transmitted, a long first data type identifier is required for distinguishing between these different types, thereby necessitating the use of a relatively long data type identifier for coding the different data types. This reduces the efficiency of the data transfer as a relative large part of the packet will be occupied by the first data type identifier.

SUMMARY OF THE INVENTION

An object of the invention is to allow the transmission of a large variety of data, without severely reducing the efficiency of the system.

A system, according to the invention is characterized in that said system further comprises packets of a second type, comprising the first data type identifier and a second data type identifier, said second data type identifier being longer than the first data type identifier, a packet of the second type being linked to a packet of the first type through the first data type identifier for linking said second data type identifier to data contained in the packet of the first type.

The invention is based on the recognition that in normal practice, not all possible varieties of data need be transmitted simultaneously, but that it is sufficient that a subset of said varieties can be transmitted, as long as all possible varieties can be included in said subset. This is achieved according to the invention by linking the second data type identifier, which is indicative of the data, through a first data type identifier to said data via a separate type of packet. As the first data type identifier now only needs to address a subset of the second data type identifier, the first data type identifier can be made shorter than the length of the second data type identifier and consequently, the efficiency of the packets comprising the first data type identifier and data is improved in comparison with a packet comprising the second data type identifier and data.

An embodiment of the system, according to the invention, is characterized in that the second data type identifier relates to a method for processing the data. In this embodiment, the second data type identifier is used for identification of the way the data has to be processed. Upon reception of the packet of the second type, comprising the link between first data type identifier and second data type identifier, a receiving station will be able to process the received data in the appropriate manner.

An embodiment of the system, according to the invention is characterized in that the system is the Radio Data System, and in that a packet is an RDS group. The invention is especially useful in the RDS system wherein a packet has a fixed length. Thus, a short first data type identifier will leave more room for data. Furthermore, through the measure of to the invention, an RDS group type code is no longer reserved for only one kind of data, relating to the function of the group type (for example group type code 0 is reserved for basic tuning information, and group type code 4 is reserved for clock-time and date), but now an RDS group type can be used for transmission of different types of data, thereby no longer restricting the number of services in RDS to the number of RDS group types.

A further embodiment of the system, according to the invention is characterized in that a packet of the first type is a version A group and a packet of the second type is a version B group. By using the version A group for the packets of the first type and the version B group for packets of the second type, an efficient use is made of the capacity of the Radio Data System, as the version A group has a capacity of 37 free bits and the version B group only 21 free bits. By choosing a first data type identifier length of for example, five bits, 32 bits remain free for data in the version A group, and 16 bits remain free for the second data type identifier in the version B group, thus allowing a subset of 32 types of data (or services) out of a total of 65536 possible types of data to be transmitted via a single RDS group type.

BRIEF DESCRIPTION OF THE DRAWINGS

The above object and features of the present invention will be more apparent from the following description of the preferred embodiments with reference to the drawings, wherein.

DESCRIPTION OF THE PROFFERED EMBODIMENTS

Figure 1:
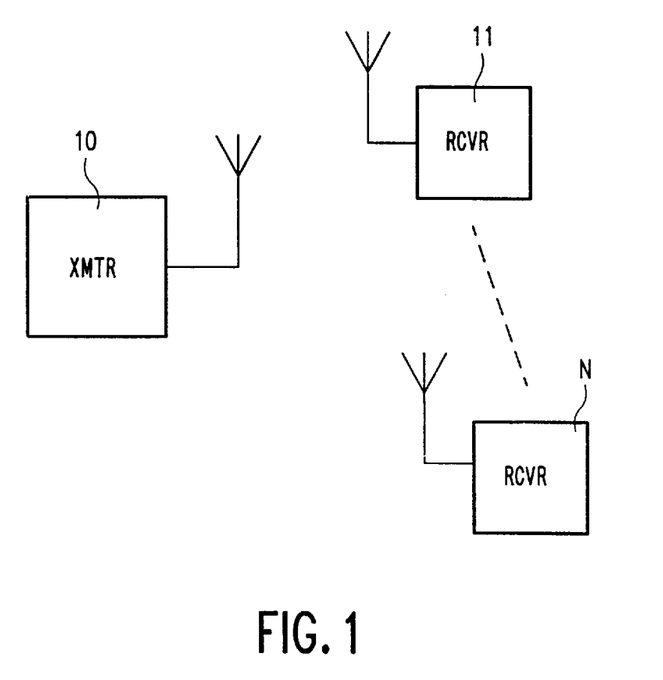
FIG. 1 is a circuit diagram of a system according to the invention.

FIG. 1 shows a system comprising a transmitting station 10 and at least one receiving station, in this case receiving stations 11 . . . N. The transmitting station 1 arranges data into packets of a first type and adds a first data type identifier to said packets, and finally transmits those packets to the receiving stations 1 . . . N. In known systems, the first data type identifier (also known as header or data label) is indicative of the type or nature of the data. When there is a large range of types of data, a relatively long first data type identifier is required for distinguishing between the possible types. In the system according to the invention, the first data type identifier is used for linking a packet of the first type to a packet of a second type. The packet of the second type also comprises a first data type identifier and further comprises a second data type identifier, which now is indicative of the type or nature of the data. The first data type identifier in the packet of the first type need not be identical to the first data type identifier in the packet of the second type, as long as it is clear that the packets are linked to each other through said first data type identifiers. Thus, the data in the packet of the first type is linked through the first data type identifiers of the packets of the first and second types to the second data type identifier in the packet of the second type. The second data type identifier can refer to the nature of the data, for instance, weather information, traffic information, but also to a protocol for decoding, or a way of processing the data it refers to (Alert C in RDS TMC, or ITTS). In the latter case, the second data type identifier can also be called a service assignment number, as it assigns a service to data, linked to the service assignment number. In general, the second data type identifier tells something about the data contained in the packet of the first type. The first data type identifier, having a length of for example, n bits, can only address a subset ($2^n$) of the range of data entities. The length of the second data type identifier is for example, m bits, wherein m is larger than n. Thus $2^m$ different data type are possible. This results in an improved efficiency of the packets of the first type, as the first data type identifier need not have such a length, that it can address all types of data. This means that still only a limited number of types of data can be transmitted, said number being limited by the length of the first data type identifier. However, in contrast with the known system, this limited number of types of data can now be chosen arbitrarily from the range of types of data, as the coupling between first data type identifier and type of data is established in the packet of the second type. In this packet, the second data type identifier can take any of the possible values, thus allowing the coupling of any type of data to a certain first data type identifier. In the system according to the invention, the coupling between a first data type identifier value and a second data type identifier value can be changed by transmitting a new packet of the second type, comprising the same first data type identifier as the previous packet of the second type, but having a new second data type identifier value. Now, the data in the packets of the first type can be of a different type than in the previously transmitted packets of the first type. This in contrast with known systems, wherein a first data type identifier value is dedicated to a particular type of data, and thus only a limited number of fixed types of data can be transmitted.

Figure 6:
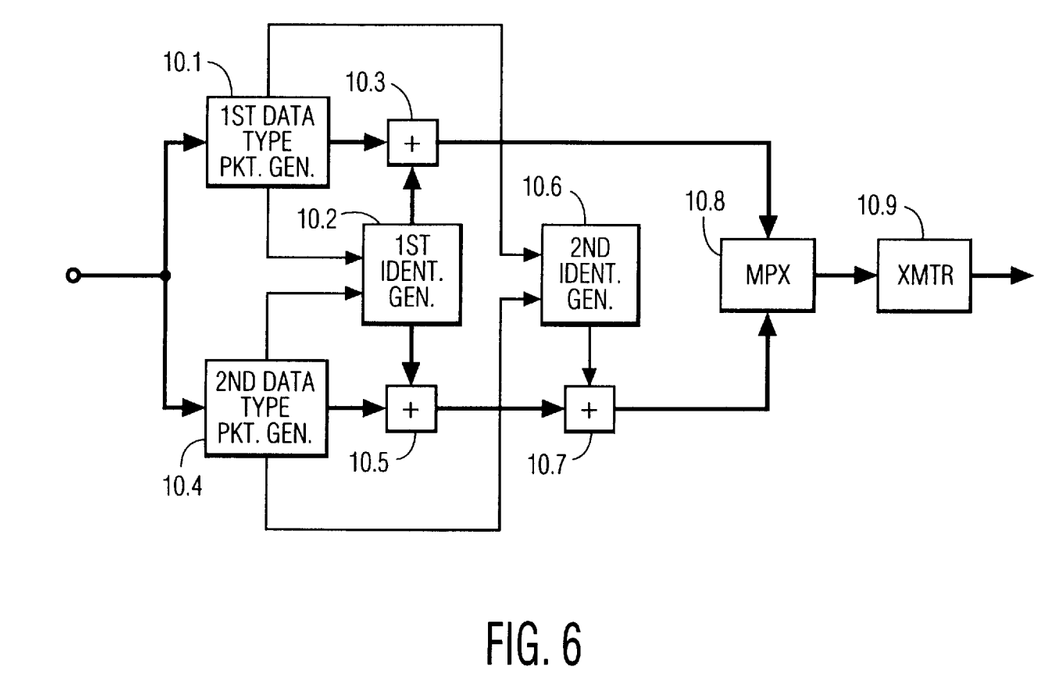
FIG. 6 is a block diagram of a transmitting station for transmitting data in packets. In the figures, identical parts are provided with the same reference numbers. In the flow diagrams, a "Y" means that a condition in the block is met, and an "N" means that the condition is not met.

FIG. 6 shows a block diagram of a transmitting station for transmitting the data packets of the first and second types. An input for receiving the data is connected to means 10.1 for arranging the data into a data packet of the first type. A first data type identifier is generated in generator 10.2 and inserted in the first type packet by a combiner 10.3. This first data type identifier identifies the data that is in the first type packet. The input data is also applied to means 10.4 for arranging the data into a data packet of the second type. The generator 10.2 then inserts another first data type identifier in the second type packet using a combiner 10.5. This another first data type identifier identifies the data in the second type packet. The first data type identifier in the first type packet does not need to be identical to the first data type identifier in the second type packet so long as the packets are linked to each other through the first data type identifiers. A second data type identifier is then generated in the generator 10.6 and is inserted into the second type packet. This second data type identifier identifies the data in both the first and second type packets. The output from the combiners 10.3 and 10.7 are applied to inputs of multiplexer 10.8 which forms the data stream to be transmitted by the transmitter 10.9.

The receiving station 11 receives the transmitted packets. The receiving station 11 then detects whether a second data type identifier corresponds to a second data type identifier stored in the receiving station itself. If the data entities do not correspond, the receiving station 11 will not be able to handle the data and the packets of the first type, comprising a first data type identifier, which is linked to the received second data type identifier, should not be processed. If the data entities correspond, this means that the receiving station 11 is equipped for handling the data, to which the second data type identifier is linked. Consequently, the first data type identifier of the packet of the second type is stored. When a packet of the first type is received, it is determined whether or not there is a link between the first data type identifier of the packet of the first type and the stored first data type identifier. If such a link exists, the data in the packet of the first type is then processed in a way or according to a protocol, indicated by the second data type identifier, linked to the data. The determination whether or not there is a link between the received and the stored first data type identifier can involve a direct comparison if the first data type identifiers need to be equal for such a link. It is also possible that the received first data type identifier should be in a predetermined relationship to the stored first data type identifier for determining that the link exists.

Figure 2A:
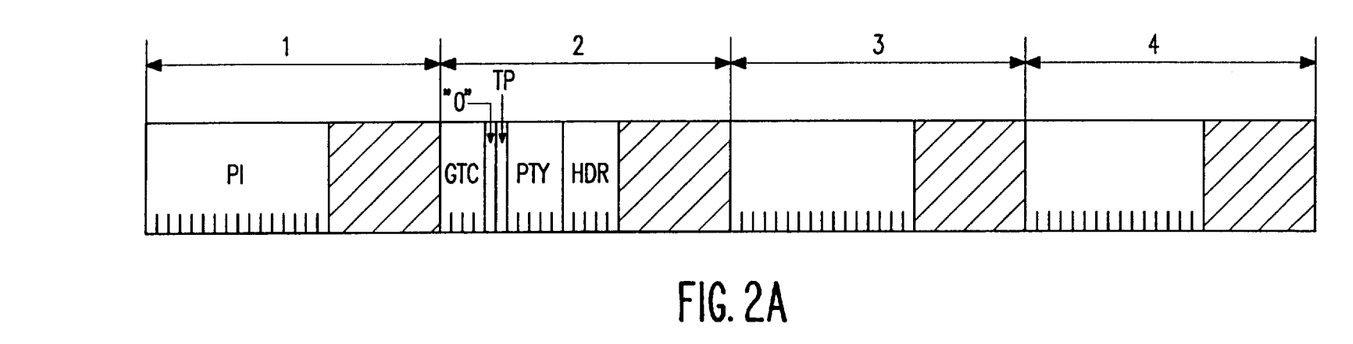
FIG. 2 is a diagram of version A and version B RDS groups according to the invention.
Figure 2B:
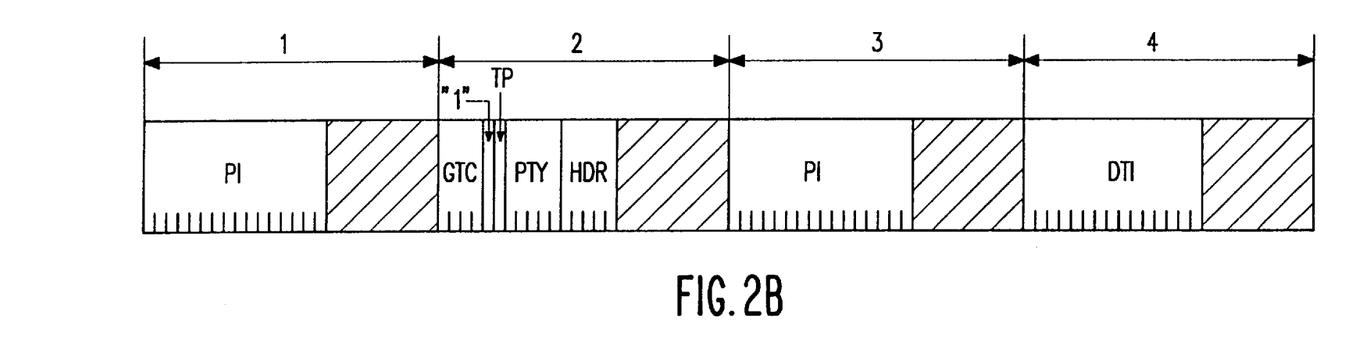

FIG. 2 is a diagram of version A and version B RDS groups according to the invention. An RDS group comprises 104 bits, divided into four blocks 1 . . . 4, each block comprising a 16 bit information word and a 10 bit checkword. The information word of block 1 comprises the PI code PI, the first four bits of the second block comprises a group type code GTC, the fifth bit of block 2 is a version bit, indicating a version A group or a version B group, the sixth bit comprising a traffic program code TP, and the seventh to eleventh bit of Block 2 comprising the PTY code. Thus 37 bits of the RDS group remain free for information. The version B group differs from the version A group in that the fifth bit in block 2 is 1 instead of 0, and in that the PI code is repeated in block 3, thus leaving only 21 free information bits instead of 37 free information bits in the version A group. The group type code in block 2 indicates the service provided in that group. For example, group type code 0 is reserved for basic tuning and switching information, whereas group type code 2 is reserved for Radiotext.

In RDS, the data in each group is restricted to the service provided by that group; no other types of data can be transmitted in those groups, other than data relating to that particular service. This means that with 16 different group type codes, only 16 different but fixed services can be transmitted, as the standard for RDS prescribes which group type is used for which service. Until now group type codes 10–13 are yet undefined. A solution to this problem can be found in reserving a part of the 37 free bits of the remaining undefined groups for a first data type identifier and the rest of the remaining bits for data. In this way, the undefined groups can be used for a number of different services indicated by the first data type identifier, said number being limited only by the length of the first data type identifier. For a large number of different services, the first data type identifier would occupy a significant number of the 37 free bits, thereby reducing the amount of bits available for data. Thus, either an inefficient use is made of the capacity of the groups, or the number of different services should be severely restricted.

A more efficient method, is given according to the invention. In this method a relatively short first data type identifier HDR is incorporated in the version A group, said short first data type identifier HDR being linked to the same first data type identifier HDR in the version B group of the same group type code, which version B group further comprises a second data type identifier DTI. This second data type identifier DTI is indicative of the type of data or service in the version A group and could be regarded as a service assignment number, assigning a service to the data linked to said second data type identifier DTI. Through the identical first data type identifiers HDR in the version A and version B groups, the data is linked to the second data type identifier DTI. The second data type identifier DTI can be made up of a large number of bits. For example, if the first data type identifier HDR has a length of only 5 bits, this leaves 32 free bits for the data in the version A group and 16 bits for the second data type identifier DTI. Thus, 65, 536 different services (corresponding to the 16 bits of the second data type identifier DTI) can be addressed in the version B group, of which a subset of 32 can be selected for transmission in the version A group. If the second data type identifier DTI having a length of 16 bits were incorporated in the version A group, this would leave only room for 21 bits of data, instead of 32 bits. This shows that in the present invention, the capacity of the version A group is significantly improved, without the disadvantage of being able to offer only a limited number of different services. As the services will not change frequently, the version B group can be transmitted with a low repetition rate when compared to the version A groups. Although the first data type identifier HDR has only a short length and thereby limits the number of services to be transmitted via one group type, this limited number will probably be sufficient in practice. An advantage now is that an arbitrary selection or subset of services out of a large number of services can be made, whereas in the previously mentioned solution, only a limited and fixed number of services would be available. Furthermore, the transmission of the second data type identifier DTI in the version B group allows the service provider to change the service attached to a particular first data type identifier HDR, by transmitting a new version B group with the same first data type identifier HDR but a different second data type identifier DTI as the previous version B group. The link through the first data type identifiers of the version A and B groups can be made by a direct comparison of the first data type identifiers, as described previously. If the first data type identifiers are identical, the link is established. It is also possible to link the first data type identifiers indirectly, for example, through an algorithm, in such an algorithm the first data type identifiers are compared after at least one of the first data type identifiers undergoes some kind of mathematical operation. Now the first data type identifiers do not have to be identical. It may be obvious that the length of the first data type identifier can be chosen according to the number of services required and is not restricted to exactly 5 bits.

Figure 3:
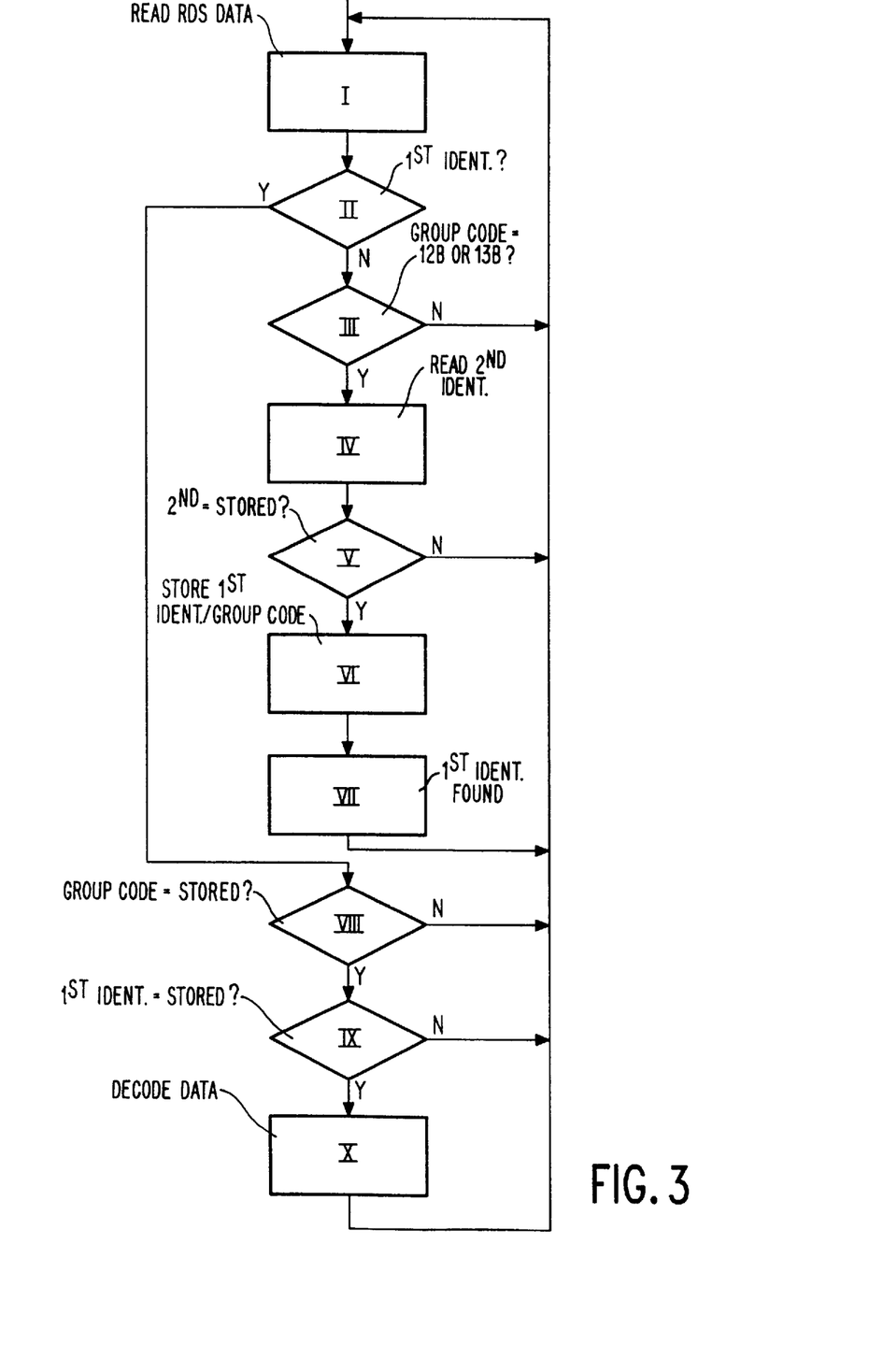
FIG. 3 is a flow diagram of a method for receiving and processing of RDS data according to the invention.

FIG. 3 shows a flow diagram of a method for receiving and processing of RDS data according to the invention. This method can be used in an RDS receiver. In this figure, the assumption is made that RDS group types 12 and 13 are used. In reality, it may involve other group types as well, and the figure should no be seen as a limitation in that sense. Table 1 shows the description of the blocks as used in FIG. 3.

TABLE 1

Meaning of the blocks used in FIG. 3.

| Block number | Description |
| --- | --- |
| I | Read RDS data |
| II | Has first data type identifier been identified? |
| III | Group type code equals 12B or 13B? |
| IV | Read second data type identifier |
| V | Second data type identifier equals stored second data type identifier? |
| VI | Store first data type identifier and group type code |
| VII | First data type identifier has been found |
| VIII | Group type code equals a stored group type code? |
| IX | First data type identifier equals a stored first data type identifier? |
| X | Decode data according to indicated protocol |

The receiving station, in this case an RDS receiver, receives an RDS signal, which is transmitted in frequency multiplex with the audio information, comprised in a frequency modulated carrier. In the RDS receiver, data entities are stored, which indicate for instance, decoding protocols for data belonging to services, indicated by the second data type identifier. This means that the receiver can only decode those services for which a protocol is implemented in the receiver, and thus, the corresponding second data type identifier is stored.

In block I, the RDS data is read in the form of groups. In block II, it is established whether or not the first data type identifier comprised in the group, has already been found. If the first data type identifier has not been found, then it is established, in block III, if the group type is equal to 12B or 13B (=version B groups of group types 12 or 13). If this is not the case, then the cycle starts again at the beginning. If the group type is 12B or 13B, then in block IV, the second data type identifier in the group is read. In block V, the second data type identifier is compared with a stored second data type identifier. If the data entities do not correspond, then the cycle starts again at the beginning. If the data entities do correspond, then (a) the group type code and the first data type identifier are stored, in block VI, and (b) the first data type identifier is marked as "found" in block VII. If in block II, it has been established that the first data type identifier was "found", then in Block VII, the group type code is checked against the stored group type code and in block IX, the first data type identifier is checked against the stored first data type identifier. If both checks are positive (both group type code and first data type identifier correspond to the stored values), then the data in the group is decoded according to the protocol indicated by the stored second data type identifier, in block X. If, however, one of the checks is negative, the cycle starts again at block I.

In addition to the application of the invention in the yet undefined group types as described previously, the invention can also be used in RDS group types, where a number of bits are not yet assigned. An example of this is RDS group type 8, the so-called Traffic Message Channel.

Figure 4A:
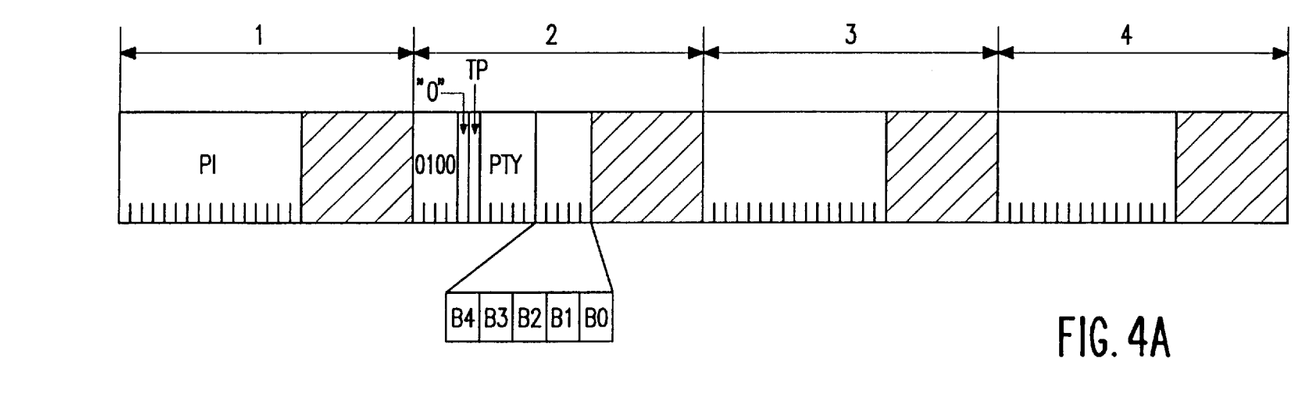
FIG. 4 is a diagram of version A and version B RDS groups of group type 8 according to the invention.
Figure 4B:
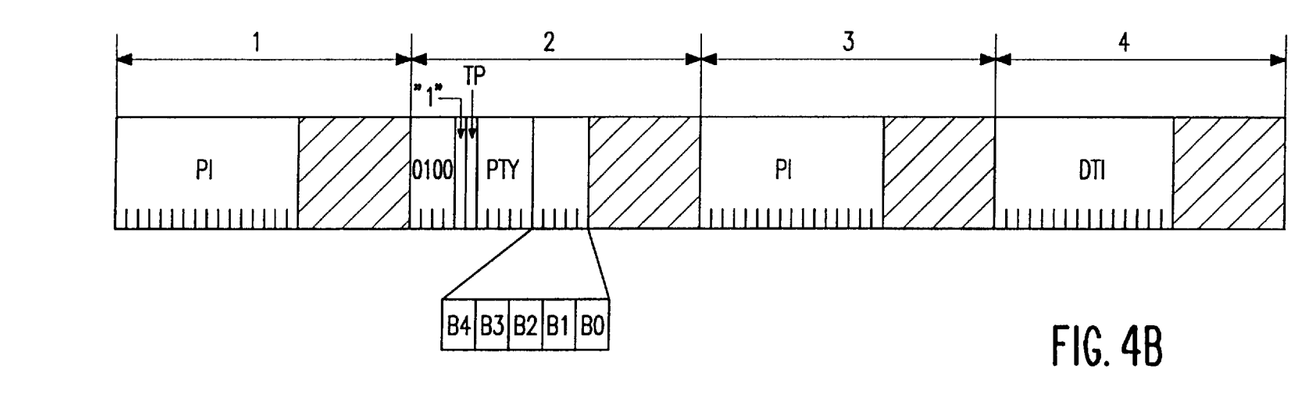

FIG. 4 is a diagram of version A and version B RDS groups of group type 8 according to the invention. By a proper allocation of the last five bits of block 2 in the version A and B groups of group type 8, more services than just the Traffic Message Channel can be transmitted. In table 2, such a bit allocation is shown for these last five bits B4..B0 of block 2 of the version A group.

TABLE 2

Allocation of bits B4..B0 of block 2 in RDS group type 8A.

| B4 | B3 | B2..B0 | Service |
|---|---|---|---|
| 0 | X | X X X | Alert C protocol |
| 1 | 0 | X X X | Alert + protocol |
| 1 | 1 | first data type identifier | Other services |

The X's indicate that these bits are not essential to the present invention. For example, they can be allocated as described in the European Application No. 95200341.6 of the Applicant, corresponding to U.S. patent application Ser. No. 08/599,837, filed Feb. 12, 1996. In the version B group, bits B4..B2 are for example, set to 0 to indicate that the information bits in the version A group are coded according to the Alert C/+ protocol. For this purpose, block 4 comprises the second data type identifier corresponding to the Alert C/+ protocol. In the version B group corresponding to the Other services, wherein bits B4 and B3 are set to 1, and B2..B0 form the first data type identifier, this first data type identifier corresponds to the first data type identifier in the version A group, in which bits B4 and B3 are each also set to 1. Now, block 4 of the version B group comprises the second data type identifier corresponding to the offered service. As the length of the first data type identifier is 3 bits, a maximum of only 8 different services can be transmitted. From the above table, it is clear that the version B group is not really needed for making a difference between the Alert C and the Alert+protocols, as this is already indicated by the values of bits B4 and B3. The above can also be applied to other RDS group types, which still have a number of unallocated bits in the version A group.

Figure 5:
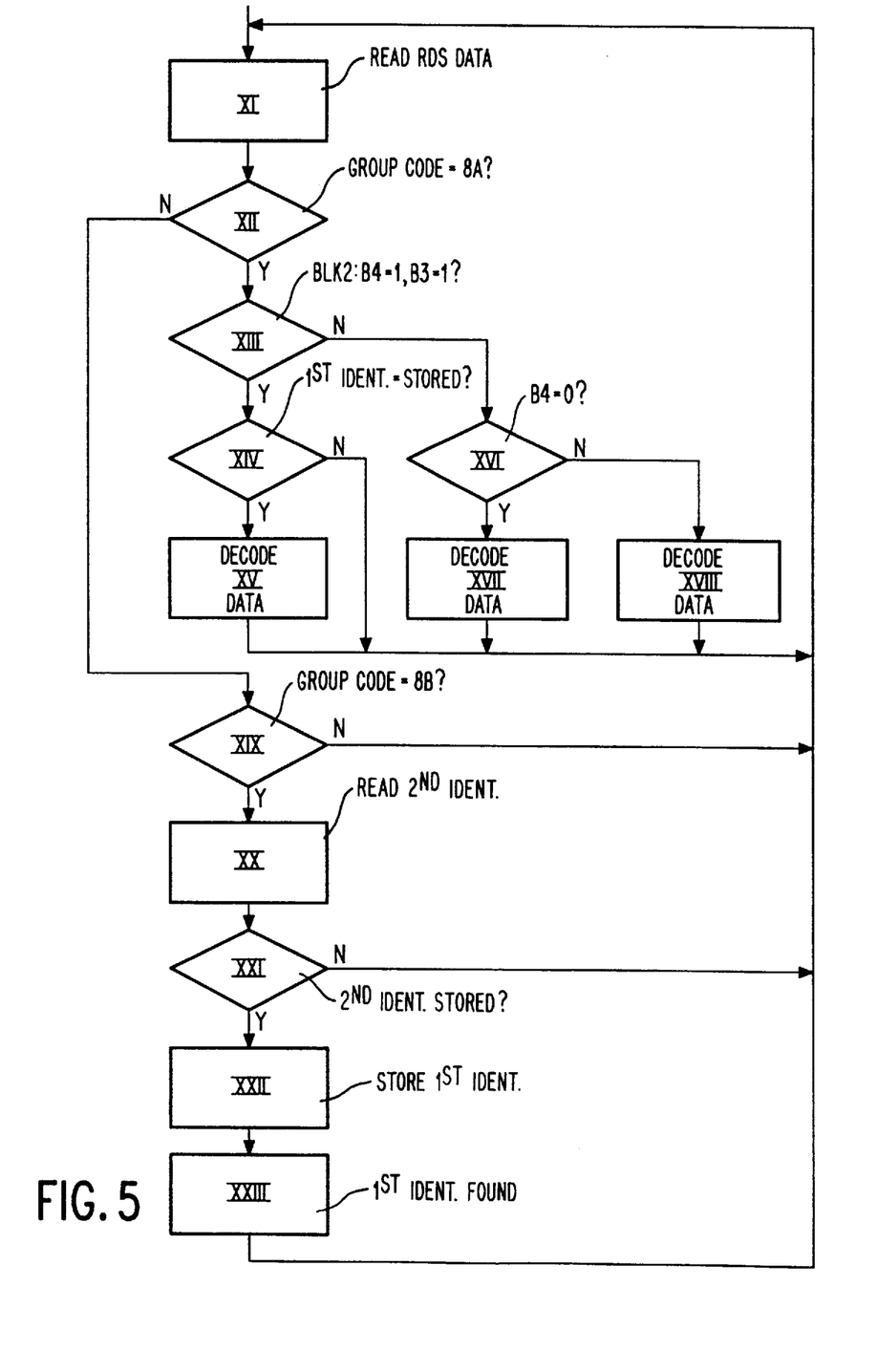
FIG. 5 is a flow diagram of a method for receiving and processing of RDS group type 8 data according to the invention.

FIG. 5 shows a flow diagram of a method for receiving and processing of RDS group type 8 data according to the invention. Table 3 shows the description of the blocks as used in FIG. 5.

TABLE 3

Description of the blocks as used in FIG. 5.

| Block number | Description |
|---|---|
| XI | Read RDS data |
| XII | Group type code = 8A? |
| XIII | Bits B4 = 1 and B3 = 1 of block 2? |
| XIV | If first data type identifier has been found: first data type identifier equals stored first data type identifier? |
| XV | Decode data according to indicated protocol |
| XVI | Bit B4=0? |
| XVII | Decode data according to Alert C protocol |
| XVIII | Decode data according to Alert + protocol |
| XIX | Group type code = 8B? |
| XX | Read second data type identifier |
| XXI | Second data type identifier equals stored second data type identifier? |
| XXII | Store first data type identifier |
| XXIII | First data type identifier has been found |

In block XI the RDS data is read. In block XII it is checked if the group type code is equal to 8A (=version A group of group type 8). If not, then in box XIX it is checked if the group type code is equal to 8B (=version B group of group type 8). If not, then the cycle starts again at block XI. If the group type code is equal to 8B, then the second data type identifier is read in block XX, and compared with a stored second data type identifier, in block XXI. If the data entities are not equal, then the cycle starts again at block XI, but if they are equal, then the first data type identifier is stored, in block XXII, and the first data type identifier is marked "found" in block XXIII. If in block XII, it is determined that the group type equals 8A, then, in block XIII, bits B4 and B3 in the second block of the version A group are checked. If both bits are set at 1, then if in block XIV, the first data type identifier is marked "found" and the first data type identifier equals the stored first data type identifier, then in block XV, the data is decoded according to the indicated protocol. If in block XIV, one of the conditions is not true, then the cycle starts at block XI again. If, in block XIII, bits B4 and B3 are not both set to 1, it is checked, in block XVI, if bit B4 is 0. If so, then the data is decoded, in block XVII, according to the Alert C protocol, and if not, the data is decoded, in block XVIII, according to the Alert+protocol.

The invention is not restricted to the implementations as given above. The length of the first data type identifier and the second data type identifier can be chosen at will. It is not necessary that first data type identifier and second data type identifier occupy the full 21 bits of the version B group. Furthermore, it is not necessary to place the first data type identifier in the second block of the version B group and the second data type identifier in the fourth block. They can of course be placed anywhere in the available 21 bits of the version B group. Finally, the invention is not restricted in its use to the Radio Data Systems, but can be widely used in other systems as well, for example, Digital Audio Broadcasting and other systems, in which a similar problem is encountered.

I claim:

1. A system for transmitting data, comprising a transmitting station and at least one receiving station, said data being arranged in packets of a first type, comprising a first data type identifier, characterized in that said system further comprises packets of a second type, comprising the first data type identifier and a second data type identifier, said second data type identifier being longer than the first data type identifier, a packet of the second type being linked to a packet of the first type through the first data type identifier for linking said second data type identifier to data contained in the packet of the first type.

2. The system of claim 1, characterized in that the second data type identifier relates to a method for processing the data.

3. The system of claim 1, characterized in that the system is the Radio Data System, and in that a packet is an RDS group.

4. The system of claim 3, characterized in that a packet of the first type is a version A group and a packet of the second type is a version B group.

5. A transmitting station for use in the system of claim 1, including:

means for arranging data in packets of the first type;

means for arranging a second data type identifier, linked to said data, in a packet of the second type;

means for providing packets of the first type and the second type with linked first data type identifiers, for linking the second data type identifier in the packet of the second type to the data in the packets of the first type; and means for transmitting said packets.

6. A receiving station for use in the system or claim 1, including:

means for receiving transmitted packets;

means for comparing a second data type identifier in a packet of the second type with a stored second data type identifier;

means for storing the first data type identifier of said packet if the data entities match;

means for determining a link between the first data type identifier of a packet of the first type and the stored first data type identifier; and means for processing data of said packet of the first typo according to a method indicated by the second data type identifier if said link between the first data type identifiers exists.

7. An RDS receiver for use as receiving station in the system of claim 3, including:

means for receiving transmitted packets;

means for comparing a second data type identifier in a packet of the second type with a stored second data type identifier;

means for comparing an RDS group type code of said packet with an RDS group type code associated with the second data type identifier;

means for storing the first data type identifier of said packet if the data entities and the RDS group type codes match;

means for determining a link between the first data type identifier of a packet of the first type and the stored first data type identifier; and means for processing data of said packet of the first type according to a method indicated by the second data type identifier if said link between the first data type identifiers exists and the RDS group type code of the packet of the first type matches the RDS group type code of the packet of the second type.

8. A method for transmitting data from a transmitting station to at least one receiving station, comprising the steps of:

(a) arranging the data in packets of a first type;

(b) providing each packet with a first data type identifier; and (c) transmitting the packets to the at least one receiving station, characterized in that the method further comprises the steps of:

(d) arranging a second data type identifier, linked to said data, in a packet of a second type;

(e) providing said packet of the second type with a first data type identifier, which is linked to the first data type identifier of those packets of the first type, to the data of which said second data type identifier is linked; and (f) transmitting the packet of the second type to the at least one receiving station.

9. A method for receiving data for use in conjunction with the method of claim 8, further comprising the steps of:

(g) receiving packets of the second type;

(h) comparing the second data type identifier in the packet with a stored second data type identifier;

(i) upon coincidence of said data entities, storing of the first data type identifier of the packet;

(j) receiving packet of a first type;

(k) determining if a link exists between the first data type identifier of the packet of the first type and the stored first data type identifier; and (l) upon determination of said link, processing of the data of the packet of the first type according to a method indicated by the second data type identifier.

10. The method of claim 9, wherein the packets are transmitted through the Radio Data System, wherein step (k) includes determining that no link exists if an RDS group type code of the packet of the first type does not correspond to the RDS group type code of the packet of the second type.

* * * * *